J. B. BULLARD.
STALK CUTTER.
APPLICATION FILED APR. 12, 1915.
1,201,932.
Patented Oct. 17, 1916.
2 SHEETS—SHEET 1.
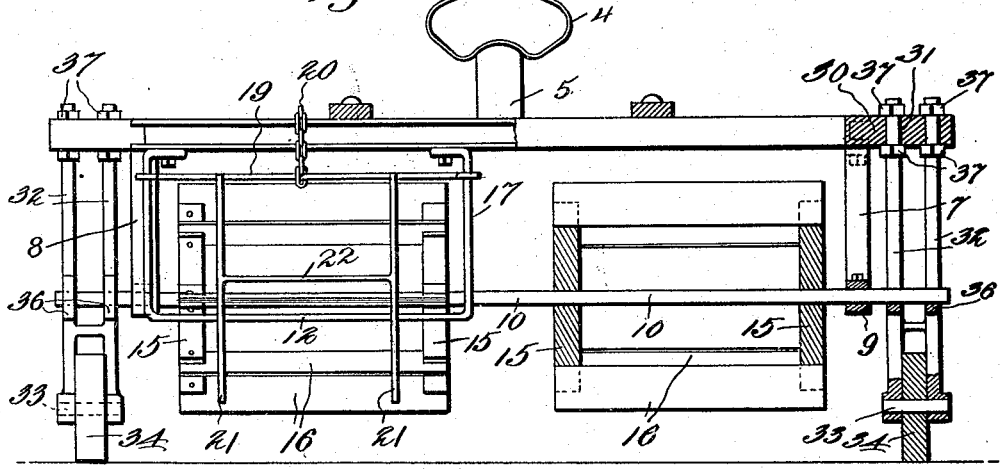
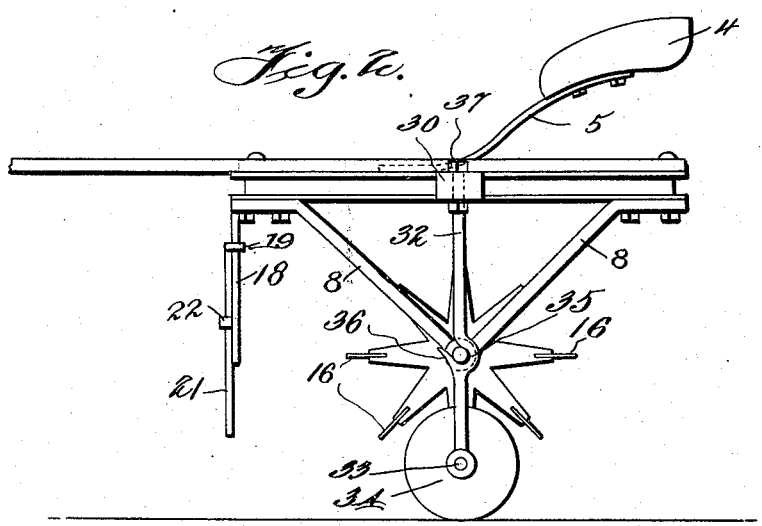
Witnesses
Inventor
J. B. Bullard,
By
Attorney

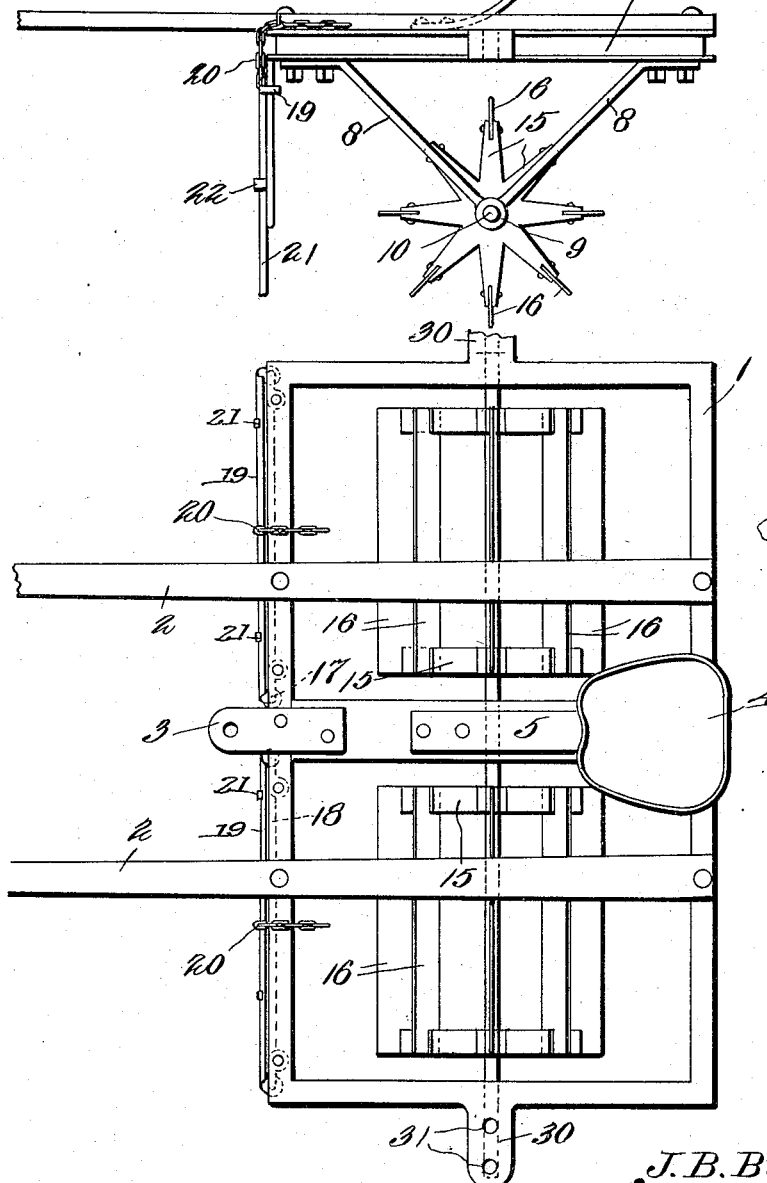

UNITED STATES PATENT OFFICE.

JAMES B. BULLARD, OF POWDER SPRINGS, GEORGIA, ASSIGNOR OF ONE-HALF TO THOMAS N. CAMP, OF POWDER SPRINGS, GEORGIA.

STALK-CUTTER.

1,201,932.     Specification of Letters Patent.     Patented Oct. 17, 1916.

Application filed April 12, 1915. Serial No. 20,883.

*To all whom it may concern:*

Be it known that I, JAMES B. BULLARD, a citizen of the United States, residing at Powder Springs, in the county of Cobb and State of Georgia, have invented certain new and useful Improvements in Stalk-Cutters; and I do hereby declare the following to be a full, clear, and exact description of the invention, such as will enable others skilled in the art to which it appertains to make and use the same.

This invention relates to an implement for cutting corn stalks or the like, prior to the preparation of the ground for seeding, and the primary object of the invention is to provide a stalk cutter which includes a plurality of rotary stalk cutting members, and wheels which are movable into or out of a ground engaging position, for moving said stalk cutting members into or out of a stalk cutting position.

Another object of this invention is to adjustably mount drags forwardly of the stalk cutting members for dragging down the stalks, prior to their being cut.

With the foregoing and other objects in view this invention consists in such novel features of construction, combination and arrangement of parts as will be hereinafter more fully described, illustrated in the accompanying drawings and claimed.

In describing the invention in detail, reference will be had to the accompanying drawings wherein like characters designate like or corresponding parts throughout the several views, and in which:—

Figure 1 is a front view, partially in section of the improved stalk cutter, Fig. 2 is a side elevation of the stalk cutter, showing the wheels in a ground engaging position, Fig. 3 is a fragmentary side elevation of the stalk cutter, and Fig. 4 is a top plan view of the stalk cutter.

Referring more particularly to the drawings, 1 designates the supporting frame of the stalk cutter, which is substantially rectangular shaped in plan, and has thills or shafts 2 secured to the upper surface thereof and projecting forwardly therefrom, for facilitating the hitching of a draft animal thereto. The frame 1 has a plate 3 secured to the upper surface thereof, to which a swingle-tree may be attached. A seat 4 is yieldably supported above the frame, by the ordinary type of spring standard 5.

The frame 1 has secured to the under surface of the ends thereof, depending bracket arms 7 and 8, which have bearings 9 formed upon their lower surfaces, in which bearings is rotatably seated a shaft 10. The shaft 10 extends throughout the entire length of the frame, and has star wheels 15 secured thereto, which are arranged in pairs, as is clearly shown in the drawings. The points of the star wheels 15 have cutting blades 16 secured thereto. The blades 16 extend across the pairs of star wheels 15, laterally of the direction of travel of the frame 1, and they are provided for cutting or topping stalks.

The forward edge of the frame 1 has U-shaped brackets 17 and 18 secured thereto, and extending downwardly therefrom, which U-shaped members are positioned forwardly of the cutters, formed by the star wheels 15 and the blades 16. The U-shaped brackets 17 and 18 have horizontally disposed rods 19 slidably mounted upon the vertical legs thereof, which rods have flexible members 20 secured thereto, intermediate of their ends, for raising or lowering the cross rods 19, and holding them in various adjusted positions upon the legs of the U-shaped members 17 and 18. Any suitable means may be attached to the frame 1, for engagement with the flexible members for holding the cross rods 19 in adjusted positions.

The cross rods 19 have vertically extending rods 21, connected thereto and extending downwardly therefrom, to which rods are connected cross bars 22. The cross bars 22 and the vertexes or horizontal portions of the U-shaped brackets 17 and 18 form drags for dragging or breaking the stalks, to insure their efficient topping or cutting by the cutting members.

The frame 1 has laterally extending projections 30 formed upon the ends thereof, which are provided with openings 31, extending vertically therethrough. The openings 31 are provided for receiving the upper ends of standards 32, which standards rotatably support axles 33, at their lower ends. Supporting wheels 34 are mounted upon the axles 33. The standards 32 have sockets 35 formed therein, intermediate of their ends, one side of which sockets are bordered by forwardly and upwardly extending prongs 36, forming approaches for the sockets. The sockets 35 are adapted for receiving the ends of the shaft 10, for supporting the cutting members, composed of the star wheels 15 and the blades 16, above the ground, when it is desired to transfer the stalk cutter from one field to another. The standards 32 are held attached to the projections 30, by means of lock nuts 36 and 37, which are placed upon the upper and lower sides of the projections 30, as is clearly shown in Fig. 1 of the drawings.

When it is desired to use the improved stalk cutter for the purpose of cutting corn stalks or the like, the auxiliary trucks which are formed of the standards 32, and the wheels 34 are removed, which permits the cutting members to rest upon the ground and rotate by the traction of the cutter, for efficiently cutting or topping of the stalks. The rods 19 and the cross bars 22, may be adjusted, at different elevations, for efficiently engaging stalks of various sizes.

From the foregoing description taken in connection with the accompanying drawings the advantages of construction and of the method of operation of the improved stalk cutter will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

In a stalk cutter, the combination, of a substantially rectangular frame, an axle rotatably suspended beneath said frame, stalk cutting members mounted upon said axle, a pair of substantially U-shaped members secured to and depending from said frame, one of said members being positioned in front of each of said stalk cutters, cross bars slidably carried by the legs of said U-shaped members, vertical rods rigidly secured to said cross bars, for adjustment therewith, and cross rods connecting each pair of vertical rods, and means connected to the center portion of said cross bars and to said frame for holding the cross bars in adjusted position.

In testimony whereof I affix my signature in presence of two witnesses.

JAMES B. BULLARD.

Witnesses:
A. W. FLORENCE,
J. W. FLORENCE.

Copies of this patent may be obtained for five cents each, by addressing the "Commissioner of Patents, Washington, D. C."